(12) United States Patent
Matsukubo et al.

(10) Patent No.: US 6,977,747 B1
(45) Date of Patent: Dec. 20, 2005

(54) IMAGE FORMING SYSTEM, IMAGE FORMING METHOD, AND STORAGE MEDIUM

(75) Inventors: Yushi Matsukubo, Ohta-ku (JP); Junichi Yamakawa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 09/705,800

(22) Filed: Nov. 6, 2000

(30) Foreign Application Priority Data

Nov. 8, 1999 (JP) .................................. 11-317232

(51) Int. Cl.[7] ............................................. G06F 15/00

(52) U.S. Cl. ..................................... 358/1.16; 358/1.13
(58) Field of Search ............................ 358/1.16, 1.13; 400/188, 76; 399/204, 125, 401

(56) References Cited

U.S. PATENT DOCUMENTS 5,954,436 A * 9/1999 Kageyama et al. ......... 400/188
6,724,492 B1 * 4/2004 Iwase et al. ............... 358/1.13

* cited by examiner

Primary Examiner—Twyler Lamb
(74) Attorney, Agent, or Firm—Fitzpatrick, Cella, Harper & Scinto

(57) ABSTRACT

An image forming system having an image information generation apparatus for generating image information, and an image forming apparatus capable of forming images on both sides of a printing medium on the basis of the image information generated by the image information generation apparatus, the image information generation apparatus comprises image information generation unit for generating image information, storage unit for storing the generated image information to allow identifying whether the image information is image information to be printed on a first surface or a second surface of the sheet.

27 Claims, 9 Drawing Sheets

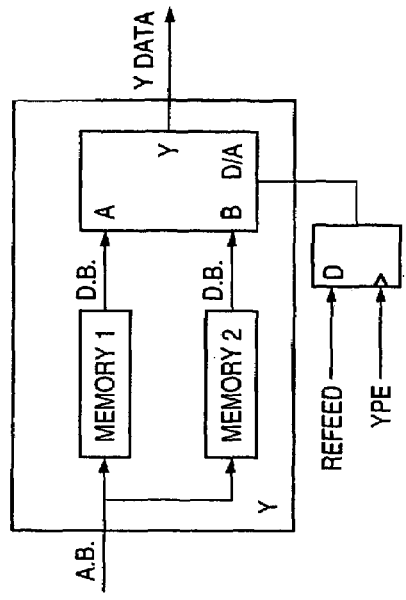
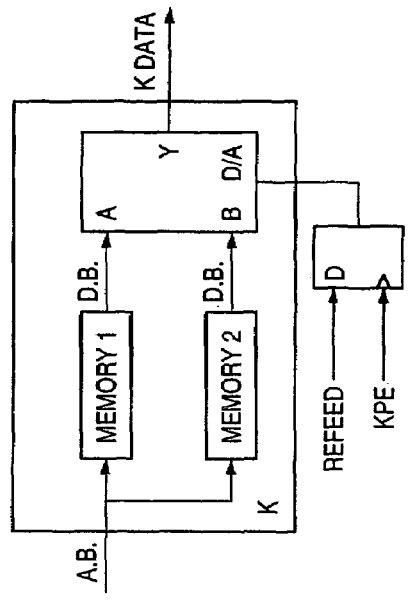
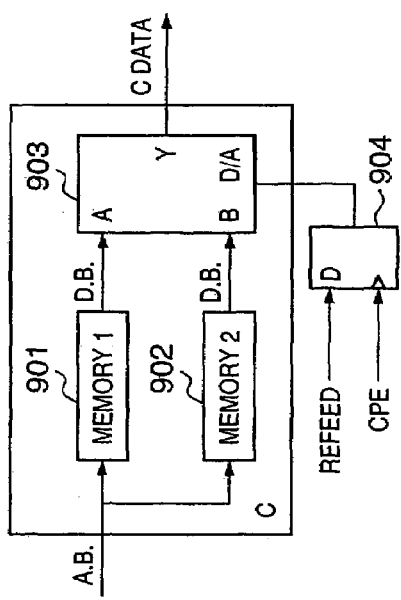
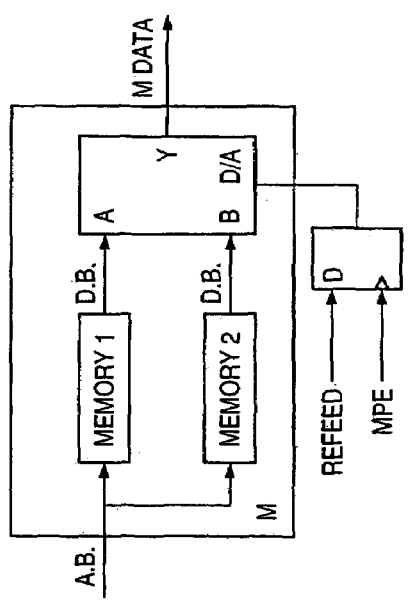

IMAGE FORMING SYSTEM, IMAGE FORMING METHOD, AND STORAGE MEDIUM

FIELD OF THE INVENTION

The present invention relates to an image forming system including a host computer, and an image forming method.

BACKGROUND OF THE INVENTION

An image forming apparatus which comprises an image read unit for reading an image and converting it into an image signal, a memory for holding the image signal, and an image output section for outputting the held image signal, and operates as a color copying machine has been proposed.

In addition, an image forming system has been proposed, which operates a color printer or operates both of a color copying machine and a color printer based on an instruction from the operator, in which the image forming apparatus and host computer are connected through a controller and which rasterizes, by the controller, color image information (PDL data) created by the host computer, holds the data in the internal memory of the controller, and then outputs the data from the image forming apparatus.

In such an image forming system, the controller has a large-capacity memory and compresses image information to store raster data corresponding an enormous number of pages in the memory.

In addition, while bitmapping PDL data, already bitmapped pages can be parallelly printed. The image forming apparatus is capable of double-side printing. The first surface pages are printed first and stored in an intermediate tray, and then, the second surface pages are printed from the intermediate tray. To print a document having pages in number larger than the stack count of the intermediate tray, paper sheets are repeatedly stacked/extracted in/from the intermediate tray in units of stack counts.

Communication control between the controller and the image forming apparatus in the prior art will be described.

The controller and image forming apparatus are connected by serial communication, and control commands are defined. As for the communication relationship, the controller serves as a master, and the image forming apparatus serves as a slave. Main control commands used for communication will be described below.

Status: A command for inquiring about the state of the image forming apparatus. The image forming apparatus returns "no paper", "error", "status ("operation in progress", "door open", and "prepare")", or "print report".

Ready Page: The image forming apparatus is notified of information related to printable pages. The apparatus is notified of "the number of pages in the ready", "paper feed/discharge positions", and "color mode".

Start: This command instructs the start of printing.

"Status" is transmitted every predetermined time. "Ready Page" is transmitted at least once before the start of printing. It may be transmitted during printing.

FIG. 6 shows the communication procedure between the controller and the image forming apparatus in executing double-side printing in the image forming system of the prior art.

In step S601, the controller sends "Status" to the image forming apparatus to inquire about its state.

In step S602, the image forming apparatus returns to the controller the paper state, the presence/absence of error, and the state of the image forming apparatus.

In step S603, pieces of information related to the page to be printed on the first surface are sent to the image forming apparatus. The controller sends to the image forming apparatus pieces of information including the number of pages, paper feed position, discharge position (intermediate tray), and color mode.

In step S604, the image forming apparatus stores the received information and notifies the controller of reception of data. If the image forming apparatus fails in storage, it transmits a resend request.

In step S605, pieces of information (the paper feed position is "intermediate tray", the discharge position is "outside the machine", and the like) related to the page to be printed on the second surface are sent to the image forming apparatus.

In step S606, the image forming apparatus notifies the controller that the pieces of received information are stored.

In step S607, the controller side instructs the start of printing. In step S608, the image forming apparatus side notifies the controller whether printing can be started. During printing, the controller periodically checks the state of the image forming apparatus by the "Status" command (S609) and knows whether the image forming apparatus has stopped upon receiving the number of printed pages in a print report "Report" (S610).

However, the conventional double-side printing has the following two problems. As the first problem, since the double-side printing uses the intermediate tray, paper feed to the intermediate tray and discharge from the machine are repeated. Hence, the productivity is low relative to through-path double-side printing using no intermediate tray.

As the second problem, since printing results of the first surface pages are temporarily stored in the intermediate tray, page processing is complicated, resulting in complexity in page control.

SUMMARY OF THE INVENTION

It is an object of the present invention to solve the above problems.

It is another object of the present invention to provide an image forming system and method which allow double-side printing with high throughput, and a storage medium storing a program for causing a computer to execute the method.

In order to achieve the above objects, according to an aspect of the present invention, there is provided an image forming system comprising:

image generation means for generating image information to be drawn on the basis of PDL data;

information management means for individually managing the generated image information as double-side printing information to be printed on upper and lower surfaces as first and second surfaces of a medium;

storage means for communicating page information which defines an attribute of the double-side printing information and individually storing the information in order to control double-side printing;

transmission request means for requesting start of transmission of the double-side printing information of the first surface or the second surface in accordance with the stored page information; and image forming means for forming an image on the basis of the double-side printing information of the first surface or the second surface, which is received on the basis of the request of the start of transmission, wherein the double-side printing is controlled on the basis of the transmission request from the transmission request means.

According to another aspect of the present invention, there is also provided an image forming method comprising:

the image generation step of generating image information to be drawn on the basis of PDL data;

the information management step of individually managing the generated image information as double-side printing information to be printed on upper and lower surfaces as first and second surfaces of a medium;

the storage step of communicating page information which defines an attribute of the double-side printing information and individually storing the information in a memory in order to control double-side printing;

the transmission request step of requesting start of transmission of the double-side printing information of the first surface or the second surface in accordance with the stored page information; and the image forming step of forming an image on the basis of the double-side printing information of the first surface or the second surface, which is received on the basis of the request of the start of transmission, wherein the double-side printing is controlled on the basis of the transmission request in the transmission request step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A to 9D are views showing the hard circuit arrangement for controlling double-side printing according to the embodiment.

DETAILED DESCRIPTION OF THE PREFERRED EMBODIMENTS

First Embodiment

As a preferred embodiment, an image forming system related to a full-color copying machine will be described below in detail. However, the present invention is not limited to this embodiment.

[Outline of System Arrangement]

Figure 3:
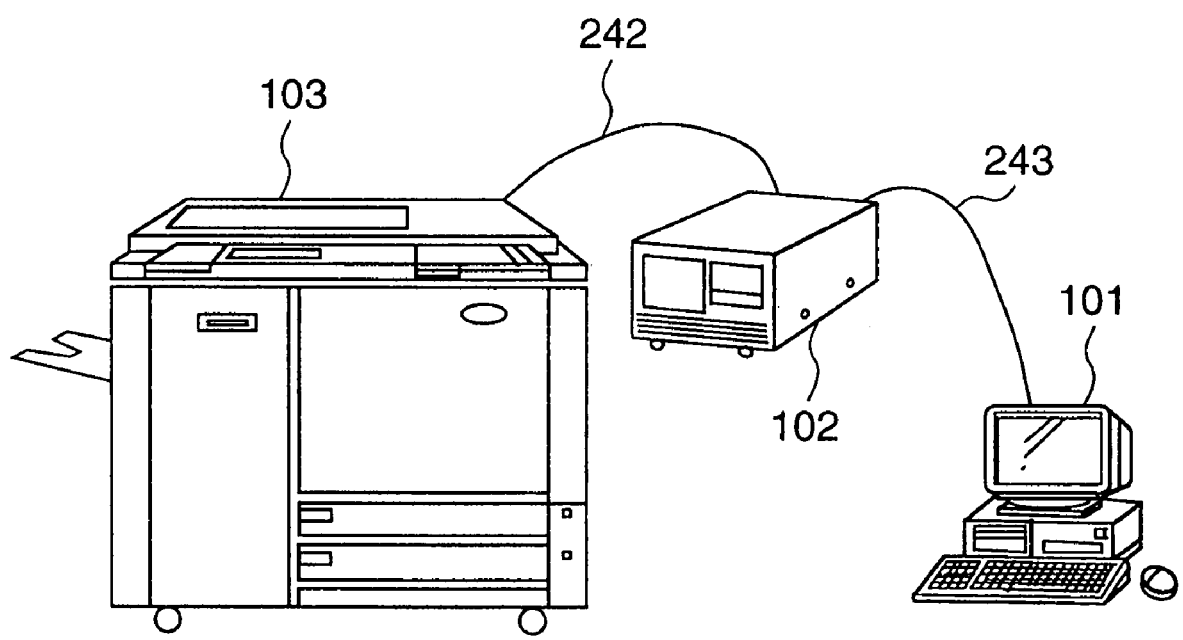
FIG. 3 is a schematic view showing the system arrangement.

FIG. 3 is a view showing the system arrangement according to the first embodiment of the present invention. Reference numeral 101 denotes a host computer; and 102, a controller. An image forming apparatus 103 copies an original placed on the original table in colors and outputs a color image sent from the computer 101 through the controller 102. On the host computer 101, so-called DTP (Desk Top Publishing) application software runs to create or edit various kinds of documents and graphics.

The host computer 101 converts a created document or graphic into PDL (Page Description Language; e.g., Post Script available from Adobe) and sends it to the controller 102 through a connection cable 243.

The controller 102 translates and rasterizes the PDL sent from the host computer 101. The rasterized image signal is sent to the image forming apparatus 103 through a connection cable 242 and output. The controller 102 may be incorporated in the image forming apparatus 103.

[Outline of Image Forming Apparatus]

Figure 2:
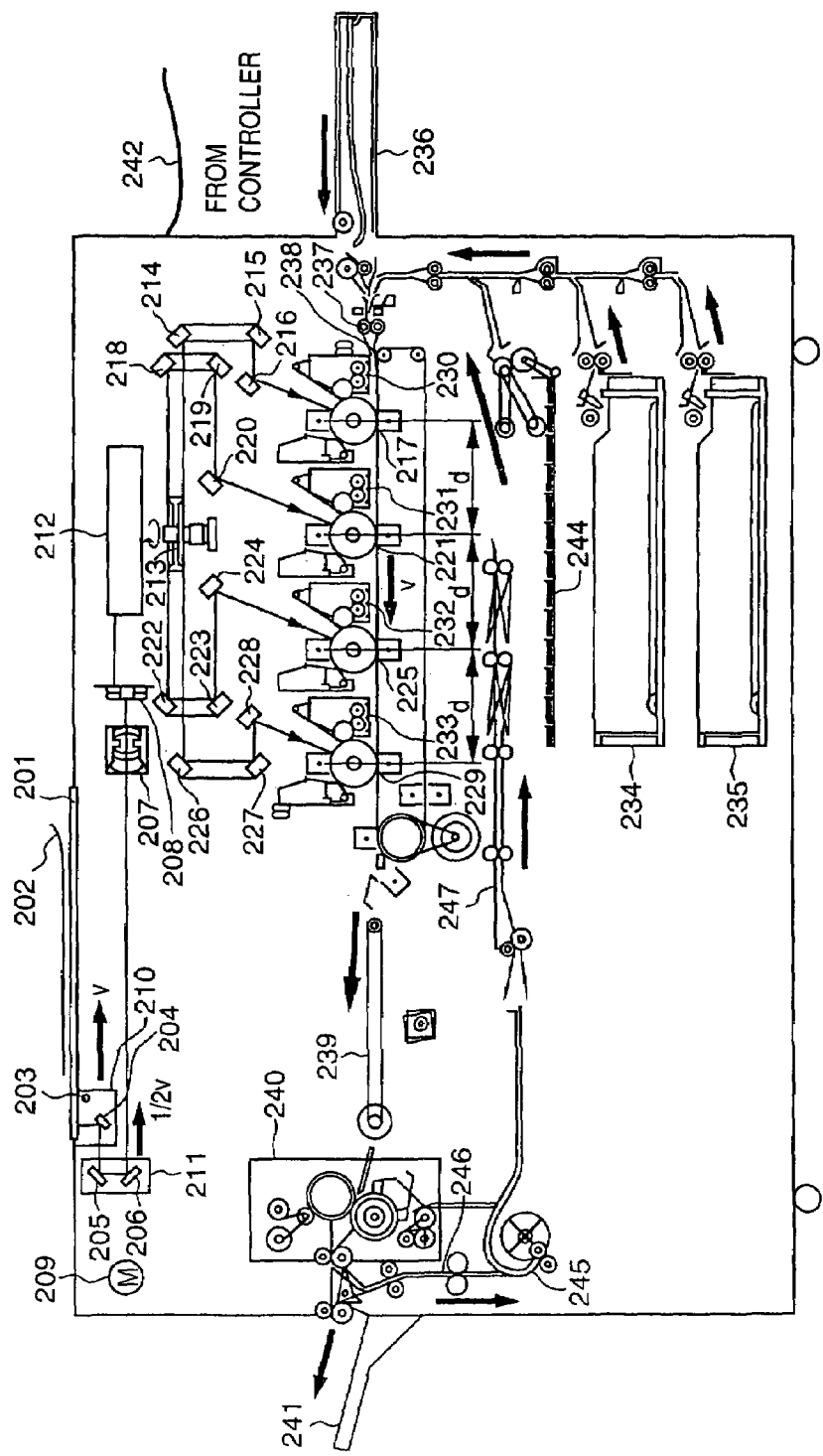
FIG. 2 is a view showing the arrangement of an image forming apparatus.

FIG. 2 is a view showing the arrangement of the image forming apparatus 103 shown in FIG. 3. In copying an original as a copying machine, an original 202 to be read is placed on an original glass table 201. The original 202 is irradiated with an illumination lamp 203, so an image is formed on a CCD 208 by an optical system 207 through mirrors 204, 205, and 206. By a motor 209, a first mirror unit 210 including the mirror 204 and illumination lamp 203 is mechanically driven at a velocity V, and a second mirror unit 211 including the mirrors 205 and 206 is driven at a velocity ½V to scan the entire surface of the original 202.

An image processing circuit section 212 processes the read image information as an electrical signal, temporarily holds the signal on an image memory 108, and outputs it as a print signal.

The print signal output from the image processing circuit section 212 is sent to a laser driver (not shown) to drive four semiconductor lasers (not shown).

A polygon mirror 213 receives four laser beams emitted by the four semiconductor lasers (not shown). The first beam scans a photosensitive drum 217 through mirrors 214, 215, and 216, the second beam scans a photosensitive drum 221 through mirrors 218, 219, and 220, the third beam scans a photosensitive drum 225 through mirrors 222, 223, and 224, and the fourth beam scans a photosensitive drum 229 through mirrors 226, 227, and 228.

A developing unit 230 for supplying yellow (Y) toner forms a yellow toner image on the photosensitive drum 217 in accordance with the laser beam. A developing unit 231 for supplying magenta (M) toner forms a magenta toner image on the photosensitive drum 221 in accordance with the laser beam. A developing unit 232 for supplying cyan (C) toner forms a cyan toner image on the photosensitive drum 225 in accordance with the laser beam. A developing unit 233 for supplying black (Bk) toner forms a black toner image on the photosensitive drum 229 in accordance with the laser beam.

The four-color (Y, M, C, and Bk) toner images are transferred to a paper sheet, and a full-color output image can be obtained.

A paper sheet fed from one of paper cassettes 234 and 235 and manual feed tray 236 is passed through registration rollers 237, chucked on a transfer belt 238, and conveyed. In synchronism with the paper feed timing, the respective color toners are developed on the photosensitive drums 217, 221, 225, and 227 in advance. As the paper sheet is conveyed, the toners are transferred to the paper sheet.

The paper sheet having the respective color toners transferred thereon is separated, conveyed by a conveyor belt 239, and after the toners are fixed on the paper sheet by a fixing unit 240, discharged to a discharge tray 241. In double-side operation, a paper sheet fed from one of the paper cassettes 234 and 235 and manual feed tray 236 is passed through the registration rollers 237, chucked on the transfer belt 238, and conveyed. In synchronism with the paper feed timing, the respective color toners are developed on the photosensitive drums 217, 221, 225, and 227 in advance. As the paper sheet is conveyed, an image is formed on the first surface, and the toners are transferred to the paper sheet.

The paper sheet having the respective color toners transferred thereon is separated, conveyed by the conveyor belt 239, after the toners are fixed on the paper sheet by the fixing unit 240, passed through a vertical discharge path 246 by a discharge deflecting plate, and conveyed to a double-side inverting section 245. After a predetermined time from the passage of the paper sheet, double-side inverting section inlet rollers are reversed. The paper sheet is inverted and conveyed to a double-side path preconvey section 247 and then to a double-side path 244. At this time, the paper sheet on the double-side path 244 has its first-page image facing upward. The paper sheet is conveyed to the double-side path, aligned, and immediately after this, refed for image formation on the second surface, passed through the fixing unit 240, and discharged to the discharge tray 241. When the double-side operation is to be continuously performed for a plurality of paper sheets, refeed from the double-side path and feed from the paper tray alternate.

In outputting an image sent from the host computer 101 through the controller 102, the image is directly transferred to a PWM circuit (not shown) through the interface cable 242 and formed, as in the copying operation.

The four photosensitive drums 217, 221, 225, and 229 are arranged at an equidistant interval d. The paper sheet is conveyed by the conveyor belt 239 at a predetermined velocity v. The four semiconductor lasers are driven in synchronism with that timing.

[Flow of Image Signal]

Figure 1:
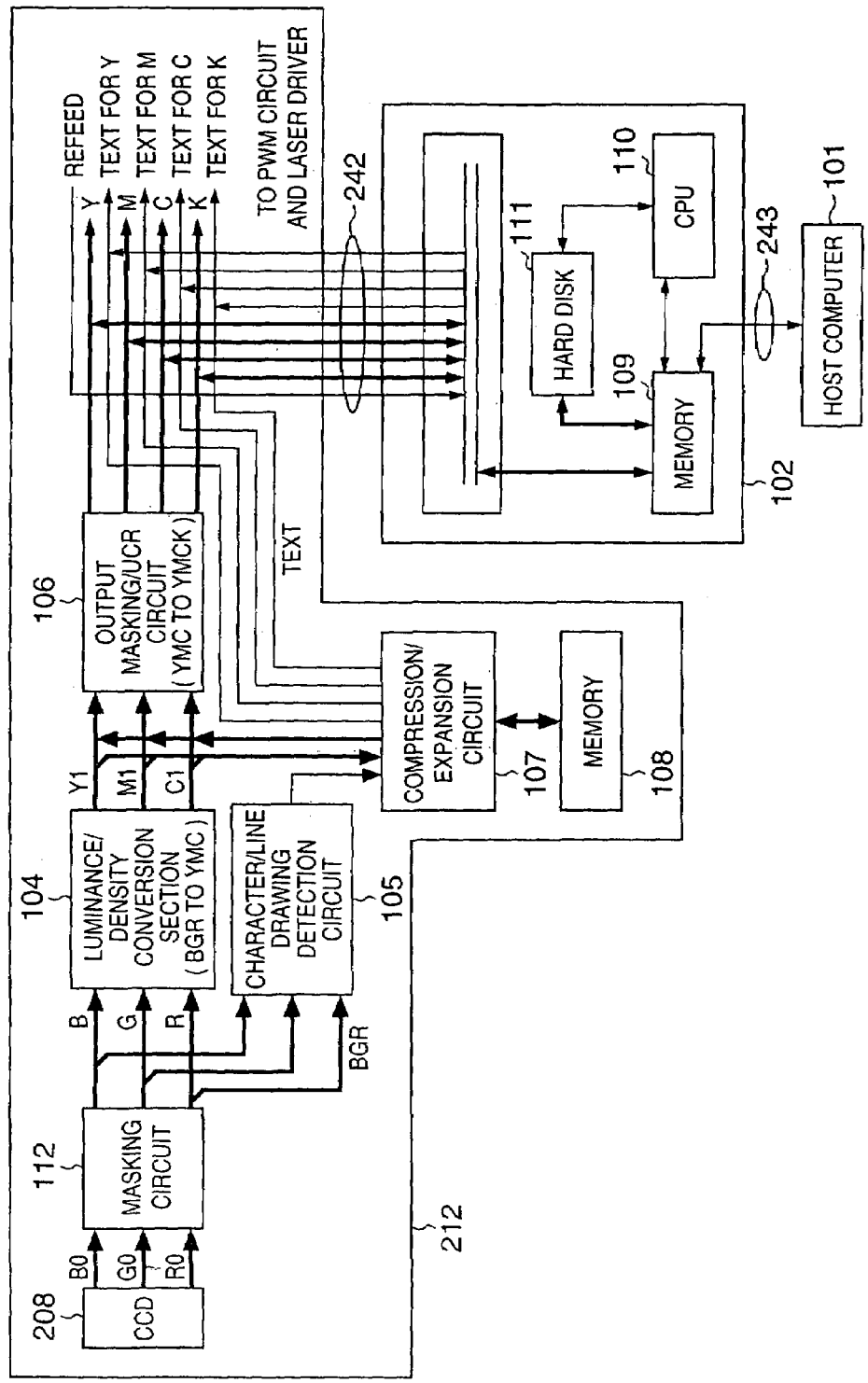
FIG. 1 is a view showing the flow of an image signal.

FIG. 1 shows the flow of an image signal. The CCD sensor 208 outputs the three, i.e., red (R), green (G), and blue (B) color components of a read image as digital signals. A masking circuit 112 converts the input (R0, G0, B0) signals into standard (R, G, B) signals by calculation using $$\begin{pmatrix} R \\ G \\ B \end{pmatrix} = \begin{pmatrix} C_{11} & C_{12} & C_{13} \\ C_{21} & C_{22} & C_{23} \\ C_{31} & C_{32} & C_{33} \end{pmatrix} = \begin{pmatrix} R0 \\ G0 \\ B0 \end{pmatrix} \qquad (1)$$

where $c_{ij}$ (i=1, 2, 3; j=1, 2, 3) is a constant unique to the apparatus, which considers various characteristics including the sensitivity characteristic of the CCD sensor and the spectral characteristic of the illumination lamp.

A luminance/density conversion section 104 formed from a lookup table in a RAM or ROM executes conversion using $$\left. \begin{aligned} C1 &= -K \times \text{LOG}_{10}(R/255) \\ M1 &= -K \times \text{LOG}_{10}(G/255) \\ Y1 &= -K \times \text{LOG}_{10}(B/255) \end{aligned} \right\} \qquad (2)$$

where K is a constant.

An output masking/UCR circuit section 106 for converting the signals M1, C1, and Y1 into signals Y, M, C, and Bk corresponding to the toner colors of the image forming apparatus executes calculation by $$\begin{pmatrix} C \\ M \\ Y \\ Bk \end{pmatrix} = \begin{pmatrix} a_{11} & a_{21} & a_{31} & a_{41} \\ a_{12} & a_{22} & a_{32} & a_{42} \\ a_{13} & a_{23} & a_{33} & a_{43} \\ a_{14} & a_{24} & a_{34} & a_{44} \end{pmatrix} \begin{pmatrix} C1 \\ M1 \\ Y1 \\ Bk1 \end{pmatrix} \qquad (3)$$

where $a_{ij}$ (i=1, 2, 3, 4; j=1, 2, 3, 4) is a constant unique to the apparatus, which considers the tint characteristic of toner. The signals C1, M1, Y1, and Bk1 have the relationship represented by $$Bk1 = \min(C1, M1, Y1) \qquad (4)$$

On the basis of equations (2), (3), and (4), the signals C1, M1, Y1, and Bk1 based on the signals R, G, and B read by the CCD sensor are corrected to the signals C, M, Y, and Bk based on the spectral distribution characteristics of toners and output.

A character/line drawing detection circuit 105 determines, for each pixel of the original image, whether it is part of a character or line drawing and generates a determination signal TEXT.

A compression/expansion circuit 107 compresses the image signals (R, G, B) and character/line drawing determination signal TEXT to reduce the information amount and then stores them in the memory 108. Alternatively, the compression/expansion circuit 107 expands the image signals (R, G, B) and character/line drawing determination signal TEXT on the basis of data read out from the memory 108.

The controller 102 is controlled by a CPU 110 such that the signals Y, M, C, and Bk matching the spectral sensitivity characteristics of the toners are stored and read out in synchronism with the image formation timing on the copying machine side. A memory 109 holds an image signal read by the CCD 208 through the cable 242 or a computer image sent from the host computer 101 through the cable 243.

[Operation of System as Standalone Copying Machine]

The system of this embodiment operates as a standalone copying machine or as a system including a controller.

The operation of the system as the standalone copying machine will be described first. In copying machine operation, an image signal read by the CCD 208 passes through the masking circuit 112 and luminance/density conversion section 104, is compressed by the compression/expansion circuit 107, and written in the memory 108. The character/line drawing determination signal TEXT detected by the character/line drawing detection circuit 105 is also compressed by the compression/expansion circuit 107 and then written in the memory 108.

Figure 4:
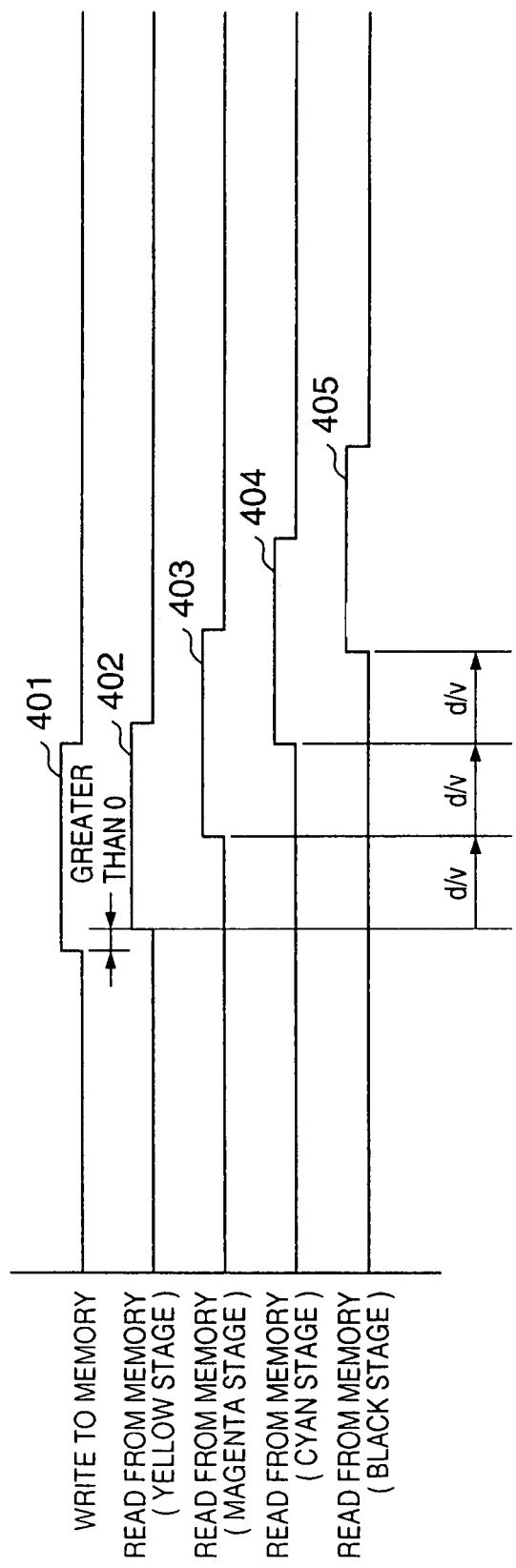
FIG. 4 is a timing chart showing operation of the system as a standalone copying machine.

Data read out from the memory 108 is expanded by the compression/expansion circuit 107, sent in accordance with the image formation timing of the copying machine, and sent to the laser driver through the PWM circuit (not shown). FIG. 4 is the timing chart of this operation.

Referring to FIG. 4, an image read by the CCD 208 is written in the memory 108 at a timing 401. The pieces of image information written in the memory 108 are read out at timings 402, 403, 404, and 405. The timings 402, 403, 404, and 405 have the relationship shown in FIG. 4, so the pieces of information are read at a time interval d/v. As described above, d is the equidistant interval between the four drums, and v is the velocity of a paper sheet conveyed by the conveyor belt.

[System Operation Including Controller]

System operation including the controller will be described next. The system operation including the controller includes scanning operation, PDL bitmapping operation, and printing operation.

The scanning operation will be described first. In this operation, an image read by the CCD 208 is received by the controller. The image information is converted into RGB data or YMCK data and held in the memory 109.

In the PDL bitmapping operation, PDL data sent from the host computer 101 is interpreted by the CPU 110 of the controller, bitmapped to a full-color image, and written in the image memory 109. This full-color image is bitmapped as image information color-separated into four colors, i.e., yellow (Y), magenta (M), cyan (C), and black (Bk) in accordance with the output characteristics of the image forming apparatus 103.

In the printing operation, the full-color image bitmapped on the image memory 109 and the signal TEXT which identifies a character or line drawing are read out in synchronism with the four drums 217, 221, 225, and 229, sent to the laser driver through the PWM circuit (not shown), and output by printing.

Figure 5:
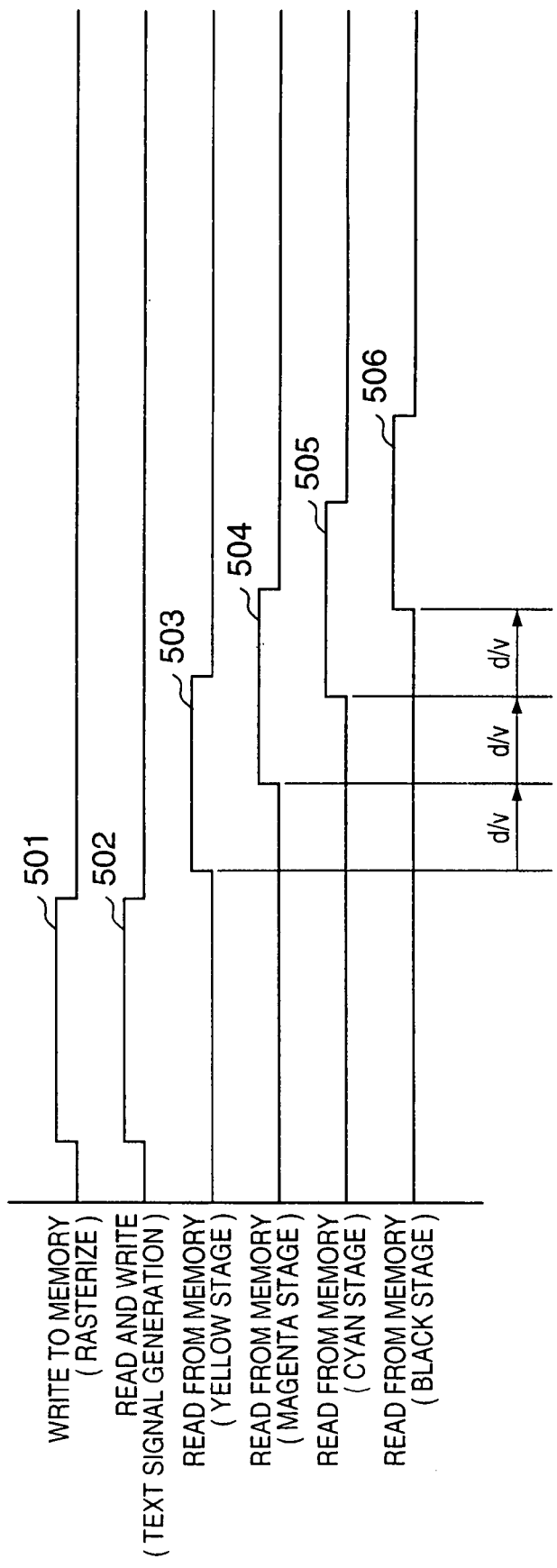
FIG. 5 is a timing chart showing operation as a system including a host computer.
Figure 6:
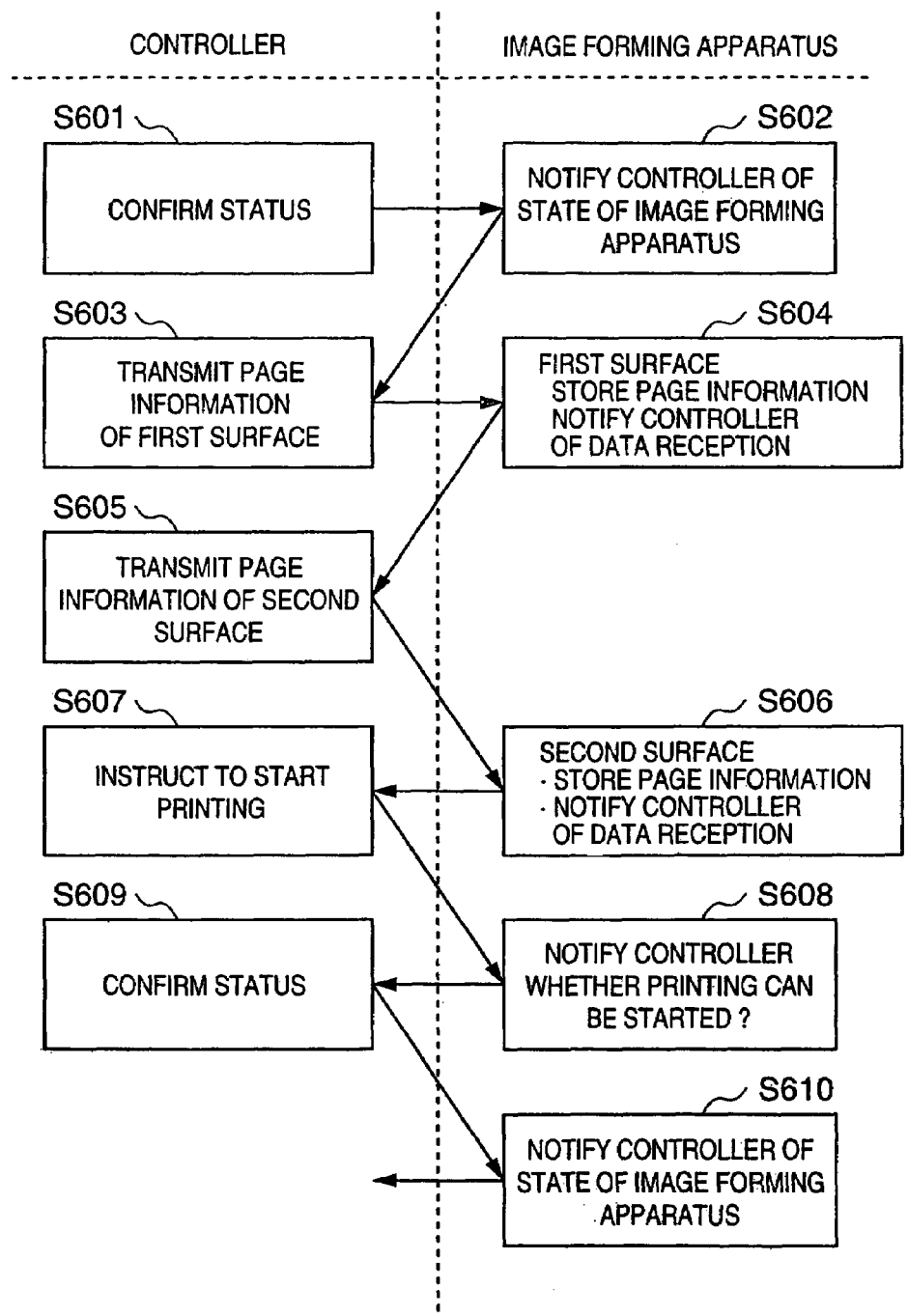
FIG. 6 is a view showing communication between a controller and an image forming apparatus in a prior art.

FIG. 5 is a timing chart showing the operation of the system including the controller.

Referring to FIG. 5, PDL bitmapping operation is performed in a section 501, the determination signal TEXT is generated in a section 502, and simultaneously, write operation in the memory 109 is performed. Pieces of image information written in the memory 109 are read out at timings 503, 504, 505, and 506. The timings 503, 504, 505, and 506 have the relationship shown in FIG. 5, so the pieces of information are read at the time interval d/v. As described above, d is the equidistant interval between the four drums, and v is the velocity of a paper sheet conveyed by the conveyor belt.

As a characteristic feature, PDL bitmapping operation and generation of the signal TEXT are simultaneously executed. Hence, high-speed processing can be realized as compared to a case wherein these operations are sequentially performed. The simultaneous processing of these operations is controlled by the CPU 110.

[Double-Side Printing]

A case wherein processing is executed by designating double-side printing from the host computer 101 will be described. On the host computer, a printer driver generates PDL data for double-side printing. The PDL data is transferred from the host computer 101 to the controller 102 through a parallel cable or a network such as Ethernet. The controller 102 stores the transferred PDL data in an internal hard disk 111. The PDL data is bitmapped on the memory 109 by the CPU 110 of the controller 102 as a raster image. The raster data bitmapped on the memory 109 is sent to the laser driver through the interface cable 242, and printing starts.

When printing starts, a paper sheet is fed from one of the cassettes 234 and 235 and manual feed tray 236 in accordance with an instruction from the controller 102 and chucked on the transfer belt. As the paper sheet is conveyed, the image is formed on the first surface of the paper sheet. At this time, the controller 102 must send the image information of the first surface to the printer first. While the paper sheet whose first surface has the formed image is being conveyed to the double-side path 244, the second, third, and fourth paper sheets are sequentially fed, and an image is formed on the first surfaces of the respective paper sheets (third, fifth, and seventh pages). After this, after the first paper sheet is passed through the double-side path 244 and refed for image formation on the second surface (second page), paper feed from the cassette 235 or manual feed tray 236 and refed from the double-side path 244 alternate. For example, to send a document having 16 pages in ascending order, the controller sends to the printer the pieces of information in the order of 1, 3, 5, 7, 2, 9, 4, 11, 6, 13, 8, 15, 10, 12, 14, and 16

Double-side printing of image information from the controller has been described above. Printing can be executed according to the same operation as described above even when originals of a plurality of pages are read by the CCD 208, the pieces of image information are stored in the memory 108, and the images from the memory 108 are subjected to double-side printing. The basic operation of this processing is the same as in double-side printing of image information from the controller, and a description will be made using the former case as an example.

[Communication Between Controller and Printer in Double-Side Printing]

Figure 7:
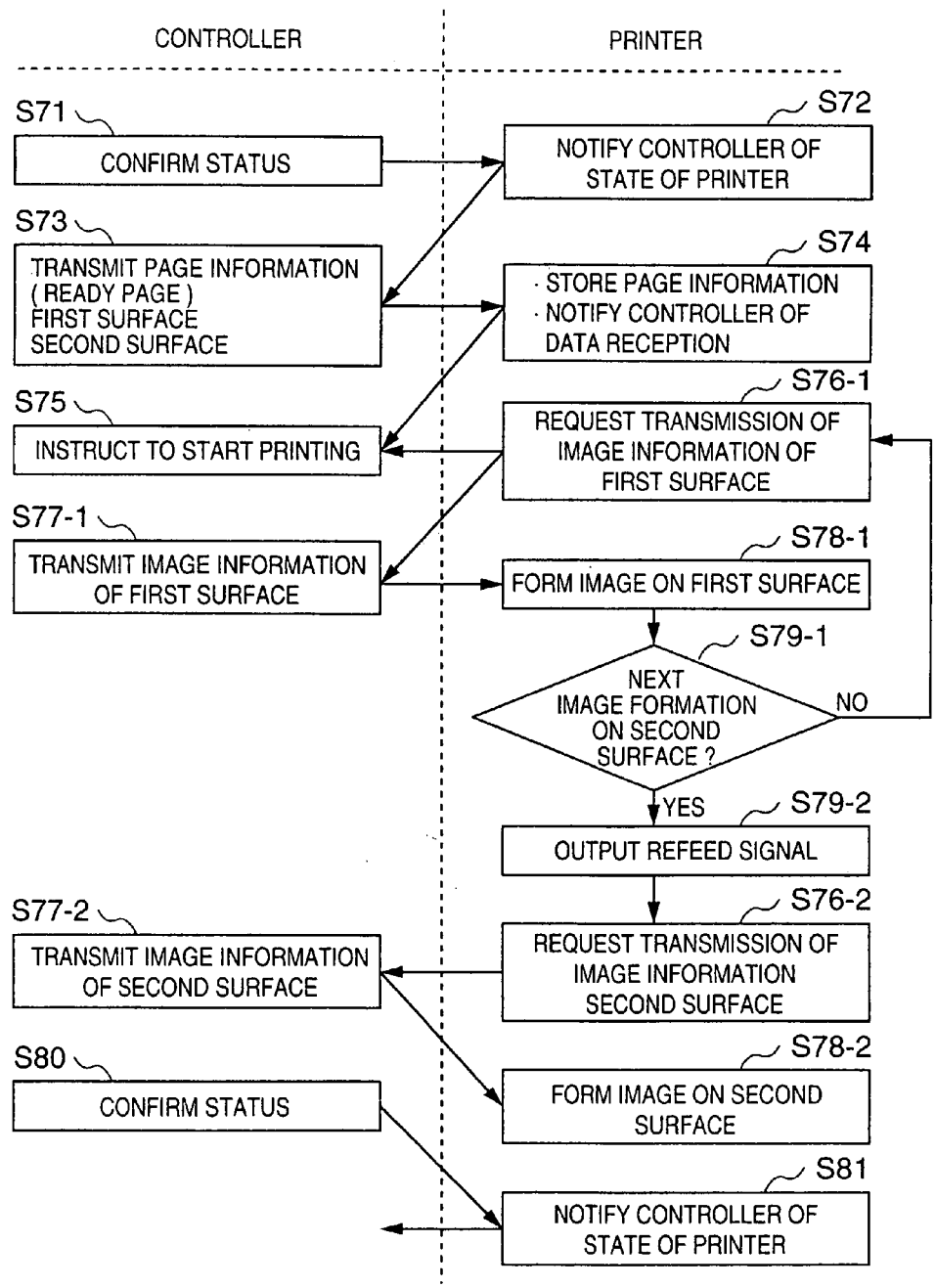
FIG. 7 is a view showing communication between a controller and a printer according to an embodiment.

Communication control between the controller 102 and the printer 103 will be described with reference to FIG. 7. Upon receiving PDL data for the host computer 101, the controller 102 bitmaps the data on the frame buffer memory 109. In step S71, the controller 102 sends "Status" to the printer to inquire about its state before the start of printing.

In step S72, the printer returns to the controller the paper state, the presence/absence of error, and the state of the printer (preparation state or printable state).

In step S73, the controller 102 sends to the printer 103 pieces of information related to the pages for double-side printing. "Ready Page" shown in FIG. 7 has a portion for sending the number of pages, a portion for sending pieces of information such as the feed position of the first surface, discharge position (intermediate tray), and color mode, and a portion for sending pieces of information such as the feed position of the second surface (double-side path), discharge position (outside the machine), and color mode. Specifically, when the bitmap data of the first and the second are made ready, the data as a pair are sent to the printer 103 by the controller 102.

In step S74, the printer 103 stores the received information and notifies the controller of reception. If the printer fails in storage, it transmits a resend request. The printer separately manages the information for the first surface and that for the second surface. If the information related to the first or second surface is different from that for the previous paper sheet, the information is sent to the printer by "Ready Page" every time. The second or subsequent "Ready Page" may be transmitted during printing.

In step S75, the start of printing is instructed. In step S76-1, the printer 103 notifies the controller whether printing can be started and requests the controller to transmit predetermined image information to the printer.

In step S77-1, the predetermined image information (e.g., image information related to the first surface of the medium) is transmitted to the printer on the basis of the image information transmission request. The printer forms an image on the basis of the data (S78-1).

In step S79-1, it is determined whether image information to be transmitted next is image information for the first surface or image information for the second surface. In the above-described printer operation or operation shown in FIG. 8 to be described later, after images are formed on the first surfaces of the first to fourth paper sheets, image formation on the second surface and image formation on the first surface are alternately performed, and then, image formation on the second surface is performed four times. However, this order changes depending on the paper size or the like. In this embodiment, when it is detected that a paper sheet has reached the refeed standby position of the double-side path 244, it is determined that image information to be transmitted next is image information for the second surface, and a refeed signal is output (S79-2). With this processing, it is specified that the image information transmission request to the controller in step S76-2 is a transmission request of the image information for the second surface. The controller transmits to the printer predetermined image information (e.g., image information related to the second surface of the medium) on the basis of the image information transmission request (S77-2). The printer forms an image on the basis of the data (S78-2).

During printing, the controller periodically transmits the "Status" command, as in step S80, to check the state of the printer. The controller 102 knows whether the printer has stopped upon receiving the number of printed pages in a printer state report in step S81.

[Management of Images for Double-Side Printing]

Figure 8:
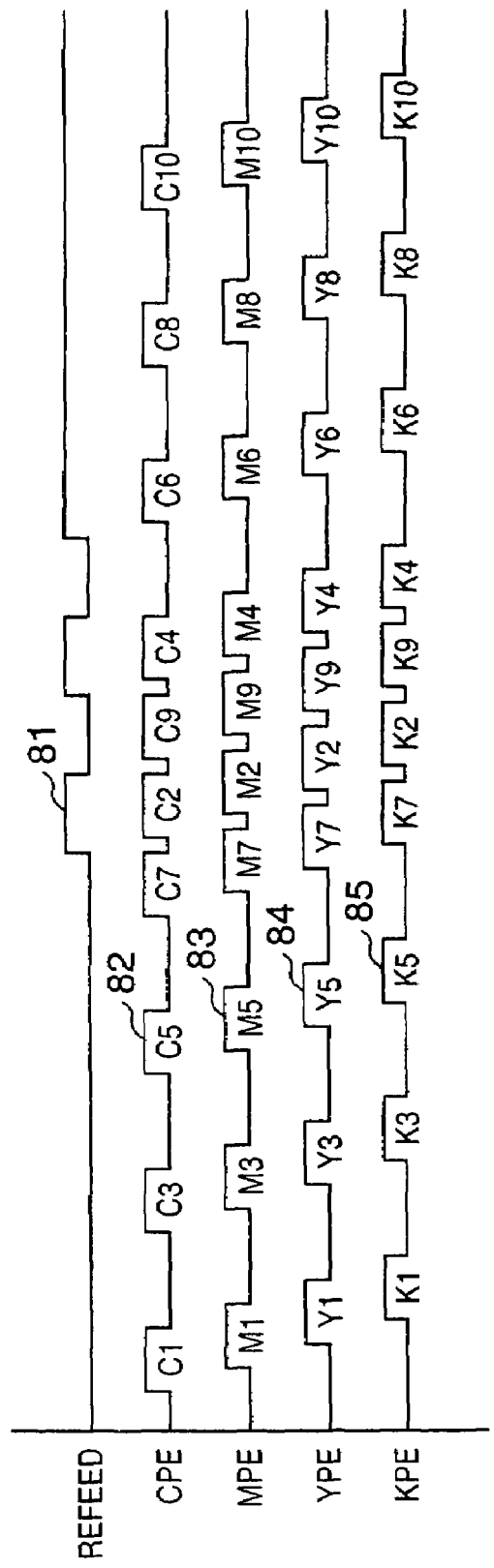
FIG. 8 is a timing chart showing the operation of an image control signal according to the embodiment.

Image signal transfer from the controller 102 to the printer 103 after the start of printing will be described with reference to FIG. 8.

The controller 102 transfers image signals in accordance with page enable signals (cyan CPE 82, magenta MPE 83, yellow YPE 84, and black KPE 85) sent from the printer in units of colors. FIG. 8 shows an example of a print job having 10 pages in ascending order. At C1 shown in FIG. 8, a cyan image signal of the first page is transferred. A refeed signal 81 (to be described later) is connected to the CPU in the controller 102. The leading or trailing edge of the refeed signal can be detected as an interrupt signal.

When printing starts, the controller 102 is set to output image information for the first surface, and transfers image signals in accordance with the page enable signals. When the paper sheet for the first page is to be refed, the refeed signal 81 goes high. When this leading edge is detected as an interrupt signal, the controller 102 is set to output image information for the second surface from the subsequent first station (cyan in this case), and transfers the image signals in accordance with the page enable signals. When the trailing edge of the refeed signal 81 is detected, the controller is set to output the image information for the first surface again from the subsequent first station, and transfers the image signals in accordance with the page enable signals. As described above, at the start of printing, the image of the first surface is set. When the leading or trailing edge of the refeed signal output from the printer is detected, the image information to be transmitted is switched between the image information for the first surface and that for the second surface, thereby managing the images for double-side printing.

Control signals are exchanged between the controller and the printer through the interface cable 242, like the video signal.

Other Embodiment

In the above embodiment, the refeed signal from the printer is transmitted through a dedicated signal line. However, it may be transmitted as one status of the printer. In the above embodiment, refeed signal detection and image information switching in the controller are done by software. However, they may be done by hardware. FIGS. 9A to 9D are views showing the circuit arrangement in this case. A memory 1 901 is a page memory for the first surface for C (cyan), and a memory 2 902 is a page memory for the second surface for C. In accordance with a signal obtained by latching a refeed signal with CPE by a latch circuit 904, a selector 903 selects data for the first surface or second surface. By switching the data in accordance with the CPE latch signal, even when the refeed signal is switched during output from the memory, the data bus from the memory is not switched. For the remaining colors as well, the data bus from each memory is switched in accordance with a signal obtained by latching the refeed signal with MPE (FIG. 9B), YPE (FIG. 9C), or KPE (FIG. 9D), thereby managing images for double-side printing.

When the number of paper sheets feedable on the double-side path can be variably controlled, the following flexible control becomes possible.

More specifically, when the paper sheet on the double-side path has reached the refeed standby position at a timing delayed from the normal timing, in the conventional method, a convey error occurs, or image formation on the second surface of the paper sheet is performed after waiting arrival of the paper sheet at the refeed standby position. In this embodiment, it can be determined by the printer whether the image of the first surface or the image of the second surface is to be formed next. Hence, in the above case, without waiting arrival of the paper sheet at the refeed standby position, a paper sheet can be fed from the cassette 235 or manual feed tray 236 for image formation on the first surface. The order of pages for image information can be flexibly controlled in accordance with the convey state of paper sheets. This can also improve the throughput.

As has been described above, in double-side printing by an image forming system including a host computer, the printer is notified of pieces of information for both surfaces of a paper sheet before the start of printing, and of the paper feed position before image signal transfer, thereby allowing double-side printing with high productivity by through-path double-side printing.

As many apparently widely different embodiments of the present invention can be, made without departing from the spirit and scope thereof, it is to be understood that the invention is not limited to the specific embodiments thereof except as defined in the appended claims.

What is claimed is:

1. An image forming system having an image information generation apparatus for generating image information, and an image forming apparatus capable of forming images on both sides of a printing medium on the basis of the image information generated by the image information generation apparatus, the image information generation apparatus comprising:
image information generation unit adapted to generate image information;
storage unit adapted to store the generated image information to allow identifying whether the image information is first image information to be printed on a first surface of the printing medium or second image information to be printed on a second surface of the printing medium;
first reception unit adapted to receive a first signal to select the first image information or the second image information in order to transmit to the image forming apparatus;

selection unit adapted to select one of the first image information and the second image information on the basis of the first signal received by said first reception unit; and first transmission unit adapted to transmit the image information selected by said selection unit to the image forming apparatus, and the image forming apparatus comprising;

second transmission unit adapted to transmit the first signal;

second reception unit adapted to receive the image information transmitted from the image information generation apparatus; and image forming unit adapted to form an image on the first surface or the second surface of the printing medium on the basis of the image information received by the second reception unit.

2. The system according to claim 1, wherein said image information generation unit generates the image information on the basis of PDL data sent from a host computer.

3. The system according to claim 1, wherein the second transmission unit transmits a request signal for requesting transmission of the image information to the image information generation apparatus and the second reception unit of the image forming apparatus receives the image information transmitted from the image information generation apparatus in accordance with the transmission of the request signal.

4. The system according to claim 1, wherein the first transmission unit transmits page information related to image information of a plurality of pages to the image forming apparatus, and the second transmission unit transmits the request signal for requesting transmission of a page related to the page information to the image information generation apparatus.

5. The system according to claim 1, wherein the image forming apparatus further comprises determination unit adapted to determine whether the first image information to be printed on the first surface of the printing medium or the second image information to be printed on the second surface of the printing medium is to be received from the image information generation apparatus, and the second said transmission unit transmits the first signal representing a determination result of said determination unit.

6. The system according to claim 5, wherein said determination unit determines whether the first image information or the second image information to be received on the basis of a convey state of the printing medium.

7. An image information generation apparatus for generating image information to be transmitted to an image forming apparatus capable of forming images on both sides of a printing medium, comprising:

image generation unit adapted to generate image information;

storage unit adapted to store the generated image information to allow identifying whether the image information is first image information to be printed on a first surface of the printing medium or second image information to be printed on a second surface of the printing medium;

reception unit adapted to receive a first signal to select the first image information or the second image information in order to transmit to the image forming apparatus;

selection unit adapted to select one of the first image information and the second image information on the basis of the first signal received by said reception unit; and transmission unit adapted to transmit the image information selected by said selection unit to the image forming apparatus.

8. The apparatus according to claim 7, wherein said image information generation unit generates the image information on the basis of PDL data sent from a host computer.

9. The apparatus according to claim 7, wherein the transmission unit transmits page information related to image information of a plurality of pages to the image forming apparatus.

10. The apparatus according to claim 9, wherein said apparatus sends the page information as a pair to be printed on the first and the second surface of the medium, after said image information are made ready to transmit.

11. An image forming apparatus capable of forming images on both sides of a printing medium on the basis of image information generated by an image information generation apparatus, comprising:

determination unit adapted to determine whether first image information to be printed on a first surface of the printing medium or second image information to be printed on a second surface of the printing medium is to be received from the image information generation apparatus;

transmission unit adapted to transmit a predetermined signal representing a determination result of said determination unit;

reception unit adapted to receive the image information transmitted from the image information generation apparatus; and image forming unit adapted to form an image on the first surface or the second surface of the printing medium on the basis of the image information received by the reception unit.

12. The apparatus according to claim 11, wherein the transmission unit transmits a request signal for requesting transmission of the page information to the image information generation apparatus.

13. The apparatus according to claim 11, wherein the reception unit receives page information related to image information of a plurality of pages from the image information generation apparatus, and the transmission unit transmits a request signal for requesting transmission of a page related to the page information to the image information generation apparatus.

14. The apparatus according to claim 11, wherein said apparatus further comprises unit adapted to determine whether the first image information to be printed on the first surface of the printing medium or the second image information to be printed on the second surface of the printing medium is to be received from the image information generation apparatus, and the transmission unit transmits the predetermined signal representing a determination result of said determination unit.

15. An image forming method having an image information generation module for generating image information, and an image forming module capable of forming images on both sides of a printing medium on the basis of the image information generated by the image information generation module, the image information generation module comprising:

an image information generation step of generating image information;

a storage step of storing the generated image information to allow identifying whether the image information is first image information to be printed on a first surface of the printing medium or second image information to be printed on a second surface of the printing medium;

a first reception step of receiving a first signal to select the first image information or the second image information in order to transmit to the image forming module;

a selection step of selecting one of the first image information and the second image information on the basis of the first signal received by said first reception step; and a first transmission step of transmitting the image information selected by said selection step the image forming module, and the image forming module comprising steps of:

a second transmission step of transmitting the first signal;

a second reception step of receiving the image information transmitted from the image information generation module; and an image forming step of forming an image on the first surface or the second surface of the printing medium on the basis of the image information received by the second reception step.

16. The method according to claim 15, wherein said image information generation step generates the image information on the basis of PDL data sent from a host computer.

17. The method according to claim 15, wherein the second transmission step transmits a request signal requesting transmission of the image information to the image information generation module, and the second reception step of the image forming module receives the image information transmitted from the image information generation module in accordance with the transmission of the request signal.

18. The method according to claim 15, wherein the first transmission step transmits page information related to image information of a plurality of pages to the image forming module, and the second transmission step transmits the request signal for requesting transmission of a page related to the page information to the image information generation module.

19. The method according to claim 15, wherein the image forming module further comprises a determination step of determining whether the first image information to be printed on the first surface of the printing medium or the second image information to be printed on the second surface of the printing medium is to be received from the image information generation module, and the second transmission step transmits the first signal representing a determination result of said determination step.

20. The method according to claim 19, wherein said determination step determines whether the first image information or the second image information is to be received on the basis of a convey state of the printing medium.

21. An image information generation method for generating image information to be transmitted to an image forming module capable of forming images on both sides of a printing medium, comprising:

an image generation step of generating image information;

a storage step of storing the generated image information to allow identifying whether the image information is first image information to be printed on a first surface of the printing medium or second image information to be printed on a second surface of the printing medium;

a reception step of receiving a first signal to select the first image information or the second image information in order to transmit to the image forming module;

a selection step of selecting one of the first image information to and the second image information on the basis of the first signal received by said reception step; and a transmission step of transmitting the image information selected by said selection step to the image forming module.

22. The method according to claim 21, wherein said image information generation step generates the image information on the basis of PDL data sent from a host computer.

23. The method according to claim 21, wherein the transmission step transmits page information related to image information of a plurality of page to the image forming module.

24. An image forming method capable of forming images on both sides of a printing medium on the basis of image information generated by an image information generation module, comprising:

a determination step of determining whether first image information to be printed on a first surface of the printing medium or second image information to be printed on a second surface of the printing medium is to be received from the image information generation module;

a transmission step of transmitting a predetermined signal representing a determination result of said determination step;

a reception step of receiving the image information transmitted from the image information generation module; and an image forming step of forming an image on the first surface or the second surface of the printing medium on the basis of the image information received by the reception step.

25. The method according to claim 24, wherein the transmission step transmits a request signal requesting transmission of the page information to the image generation module.

26. The method according to claim 24, wherein the reception step receives page information related to image information of a plurality of pages from the image information generation module, and the transmission step transmits a request signal for requesting transmission of a page related to the page information to the image generation module.

27. The method according to claim 24, wherein said method further comprises a determination step of determining whether the first image information to be printed on the first surface of the printing medium or the second image information to be printed on the second surface of the printing medium is to be received from the image information generation module, and the transmission step transmits the predetermined signal representing a determination result of said determination step.

* * * * *

UNITED STATES PATENT AND TRADEMARK OFFICE
CERTIFICATE OF CORRECTION

PATENT NO. : 6,977,747 B2 Page 1 of 1
APPLICATION NO. : 09/705800
DATED : December 20, 2005
INVENTOR(S) : Matsukubo et al.

It is certified that error appears in the above-identified patent and that said Letters Patent is hereby corrected as shown below:

TITLE PAGE:
(75) Inventors: Yushi Matsukubo, "Ohta-ku (JP)" should read -- Kanagawa (JP) --; and
Junichi Yamakawa, "Ohta-ku (JP)" should read -- Kanagawa (JP) --.

COLUMN 1:
Line 27, "corresponding" should read -- corresponding to --.

COLUMN 8:
Line 9, "9" should read -- 9. --.

COLUMN 10:
Line 42, "be," should read -- be --.

COLUMN 11:
Line 8, "comprising;" should read -- comprising: --.

Signed and Sealed this

Twenty-second Day of August, 2006

JON W. DUDAS
*Director of the United States Patent and Trademark Office*